June 17, 1958      G. SVOBODA      2,839,308
ROTATABLE WORK HOLDERS FOR IRREGULARLY SHAPED PARTS
Filed Aug. 30, 1955
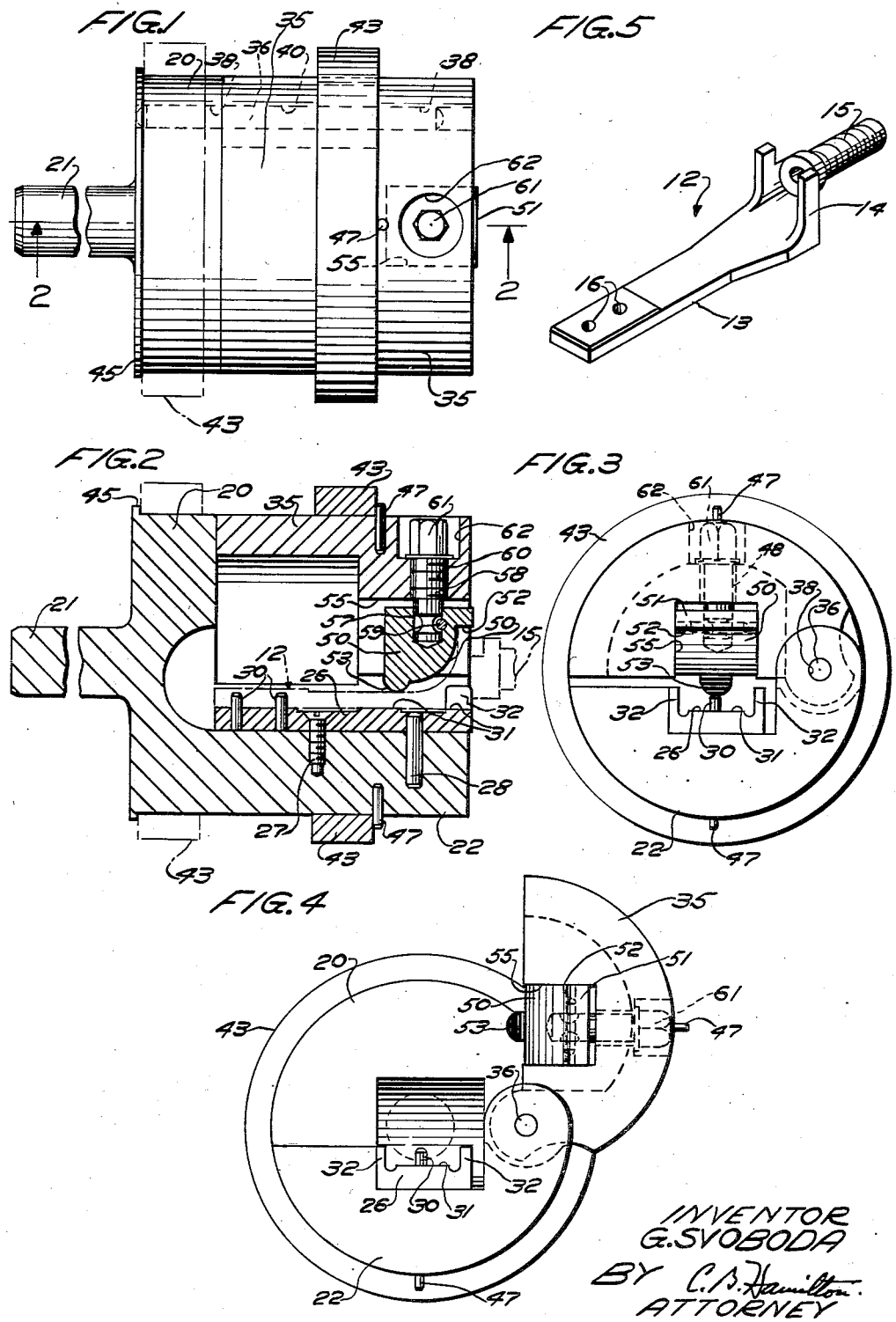
INVENTOR
G. SVOBODA
BY C. B. Hamilton
ATTORNEY United States Patent Office 2,839,308
Patented June 17, 1958

2,839,308

ROTATABLE WORK HOLDERS FOR IRREGULARLY SHAPED PARTS

George Svoboda, Berwyn, Ill., assignor to Western Electric Company, Incorporated, New York, N. Y., a corporation of New York Application August 30, 1955, Serial No. 531,517

2 Claims. (Cl. 279—106)

This invention relates to chucks and more particularly to rotatable work holders for supporting irregularly shaped articles while they are being machined.

An object of the present invention is to provide a device for clamping and supporting an irregularly shaped article for rotation while it is being worked on.

A device illustrating certain features of the invention may include a cylindrical body adapted to be secured to a spindle of a screw mechanism and rotated about an axis and having a substantially semi-cylindrical jaw extending therefrom in an axial direction and provided with a seat conforming to a portion of an article to be rotated for receiving the article in predetermined position. A substantially semi-cylindrical movable jaw is pivotally mounted on the body for oscillatable movement to a closed position with the article gripped between the jaws, and a ring slidably mounted on the body may be moved axially over the jaws to hold the movable jaw in closed position while the device is being rotated and the article is being machined. The movable jaw has a seat conforming to another portion of the article to clamp it against the other jaw, and the seat on the movable jaw may be adjustably mounted and actuated after the movable jaw is locked in its closed position to clamp the article more firmly against the stationary jaw.

Other objects and advantages of the invention will become apparent by reference to the following detailed description thereof and the accompanying drawings illustrating a preferred embodiment of the invention, in which Fig. 1 is a plan view of the work holder;

Fig. 2 is a vertical longitudinal sectional view of the work holder taken along the line 2—2 of Fig. 1 and showing in dotted lines the part or article clamped therein;

Fig. 3 is an end view of the work holder with the movable jaw in closed position;

Fig. 4 is an end view of the work holder with the movable jaw in open position for loading a part or article therein; and Fig. 5 is a perspective view of a part which is to be clamped in the work holder.

The present chuck or rotatable work holder is designed to clamp an irregularly shaped article 12 which has an elongated flat portion 13 with a lateral disposed head 14 thereon from which projects a cylindrical portion 15 which is disposed in parallel and offset relation to the flat portion 13 and which is to be finished and threaded. A pair of apertures 16 are formed in the flat portion 13.

The work holder comprises a body 20 having a cylindrical outer surface and a shank 21 extending coaxially from one end thereof, by means of which the chuck may be secured in a screw machine or the like and rotated about its axis. The body has an integral substantially semi-cylindrical jaw 22 which extends in the opposite direction from the shank, has an outer cylindrical surface aligned with and forming a continuation of the cylindrical surface of the body, and has a seat 26 conforming to one portion of the article 12 for supporting and positioning it thereon. For convenience of manufacture the seat 26 is made as a separate part and is secured to the jaw 22 by a screw 27 and pin 28. The seat has a pair of aligning pins 30 engageable in the apertures 16 of the article 12, supporting surfaces 31 engageable with one side of the article, and a pair of ears 32 engageable with opposite edges of the article for accurately positioning it with the cylindrical portion 15 in coaxial alignment with the axis of the body 20.

A substantially semi-cylindrical movable jaw 35 is pivotally mounted on the body 20 for oscillatable movement on a pin 36 from an open position shown in Fig. 4 to a closed position shown in Fig. 3 in which latter position the cylindrical outer surface thereof is concentric and aligned with the cylindrical outer surface of the jaw 22 and the body 20. The pin 36 is supported in parallel relation to the axis of the body 20 in bores 38 in the body 20 and jaw 22 and extends through a bore 40 in the end portion of the movable jaw 35. A locking ring 43 is slidably mounted on the body 20 for movement from an inoperative position shown in dotted lines in Figs. 1 and 2 to an operative position encircling the stationary and movable jaws 22 and 35 as shown in full lines in Fig. 2 to lock the movable jaw in closed position during rotation of the chuck. A flange 45 on the body member 20 and a pair of pins 47 on the stationary and movable jaws limit the axial movement of the locking ring 43 to and from its inoperative and operative positions, respectively.

The movable jaw 35 is provided with a seat 50 which has portions 52 and 53 engageable with portions of the article 12 to clamp it against the stationary jaw 22 and the seat 26 therein. The seat 50 is made as a separate part and may be adjustably mounted on the movable jaw 35 to form a clamping element adapted to be actuated to more firmly clamp the article 12 against the stationary jaw 22 after the movable jaw has been moved to its closed position and locked therein by the locking ring 43. As shown the seat 50 is rectangular in cross section and is slidably mounted for radial movement in a rectangular longitudinally disposed recess 55 in the movable jaw 35 and has a recess 57 for receiving one end of a threaded actuating member 58 to which the seat is loosely connected by a pin 59 which is fixed to the seat 50 and fits in a groove in the actuating member. The seat 50 may tilt on the end of the actuating member 85 to adjust itself to slight variations in the articles 12 and to equalize the pressure applied to the article 12 by the portions 52 and 53 of the seat. The threaded actuating member 58 is mounted in a threaded aperture 60 in the movable jaw 35 and has a head 61 disposed in the counterbored portion 62 of the aperture 60, which head 61 may be engaged by a tool and turned for imparting movement to the clamping element.

When it is desired to machine and thread the portion 15 of the article 12, the movable jaw 35 is moved to its open position, the article is placed in proper position on the seat 26 of the jaw 22, the movable jaw 35 is swung to its closed position to bring the seat 50 into engagement with the part 12 for holding it against the seat 26, after which the locking ring is moved from its inoperative position to its operative position encircling the movable and stationary jaws to lock the movable jaw in its closed position. If the article 12 is not clamped sufficiently tight the actuating element 58 may be rotated to actuate the clamping member 51 to more tightly clamp the article against the stationary jaw 22. On completion of the machining and threading operation the locking ring 43 is moved from its operative position around the jaws to its inoperative position on the body, the movable jaw is swung to its open position, and the article removed from the chuck. If the actuating element 58 has been tightened after the movable jaw 35 has been swung to its closed position and locked therein by the locking ring, then on completion of the machining operation on the article 12 the actuating element 58 is loosened prior to sliding the locking ring 43 to its inoperative position. From the above description, it will be seen that a chuck or work holder is provided in which parts of irregular shape may be readily clamped and firmly held while the parts are being rotated and machined.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A quick acting work holder for supporting an irregularly shaped article for rotation comprising a body member capable of being supported in a lathe for rotation about an axis and having a fixed jaw thereon, said body member and said fixed jaw having aligned cylindrical outer surfaces concentric with said axis and said fixed jaw having a seat conforming to a portion of said article for supporting the article in a predetermined position relative to said axis, a movable jaw mounted on said body member for pivotal movement to a closed position about a second axis parallel to said first-mentioned axis for holding the article against the fixed jaw, said movable jaw in its closed position having a cylindrical outer surface aligned and concentric with the cylindrical surfaces of said body member and said fixed jaw, a ring slidably mounted on said body member for movement from an inoperative position in spaced relation to said movable jaw to an operative position encircling the jaws for locking the movable jaw in closed position, a clamping member having portions thereof conforming to and engageable with other portions of the article, a rotatable actuating member threadedly supported on the movable jaw for swivelly supporting the clamping member thereon, said actuating member being manually actuable to cause the clamping member to clamp the article against the seat on the fixed jaw, and means on said body member and said jaws for limiting the movement of the locking ring to and from its operative and inoperative positions.

2. In a quick acting work holder for supporting an irregularly shaped article for rotation, the combination of a body member capable of being supported in a lathe for rotation about an axis and having a jaw fixed thereon, said body member and said fixed jaw having aligned outer cylindrical surfaces concentric with said axis, a movable jaw mounted on said body member for pivotal movement to a closed position for holding an article against the fixed jaw, said movable jaw in its closed position having an outer surface aligned with the outer cylindrical surface of said body member, a ring slidably mounted on said body member for movement from an inoperative position thereon in spaced relation to the jaws to an operative position encircling the jaws for locking the movable jaw in closed position, means on said body member and said jaws for limiting the movement of the locking ring to and from its operative and inoperative positions, a seat on the fixed jaw conforming to and engageable with one side of the article for supporting the article in a predetermined position on the fixed jaw and relative to the axis of rotation, an adjustable seat on the movable jaw conforming to and engageable with another side of the article, and means on said movable jaw for moving the adjustable seat to clamp the article against the seat on the fixed jaw.

References Cited in the file of this patent

UNITED STATES PATENTS

| 922,936 | Miller | May 25, 1909 |
| 2,525,857 | Bodmer | Oct. 17, 1950 |
| 2,767,992 | Emrick | Oct. 23, 1956 |

FOREIGN PATENTS

| 304,589 | Germany | Mar. 26, 1918 |